United States Patent
Min

(10) Patent No.: US 12,013,966 B2
(45) Date of Patent: Jun. 18, 2024

(54) SYSTEM AND METHOD FOR INTEGRATED USAGE OF PERSONAL DATA USING SCRAPING TECHNOLOGY BASED ON END-USERS CONSULTATION

(71) Applicant: Gyenggwon Min, Seoul (KR)

(72) Inventor: Gyenggwon Min, Seoul (KR)

( * ) Notice: Subject to any disclaimer, the term of this patent is extended or adjusted under 35 U.S.C. 154(b) by 376 days.

(21) Appl. No.: 17/520,728

(22) Filed: Nov. 8, 2021

(65) Prior Publication Data
US 2022/0147652 A1    May 12, 2022

(30) Foreign Application Priority Data

Nov. 11, 2020 (KR) .................. 10-2020-0149825

(51) Int. Cl.
*G06F 21/62* (2013.01)

(52) U.S. Cl.
CPC .. *G06F 21/6245* (2013.01); *G06F 2221/2115* (2013.01); *G06F 2221/2117* (2013.01)

(58) Field of Classification Search
CPC ......... G06F 21/6245; G06F 2221/2115; G06F 2221/2117; G06F 21/6254; G06F 21/31; G06F 21/6218; G06F 21/64; G06Q 50/26
See application file for complete search history.

(56) References Cited

U.S. PATENT DOCUMENTS

| | | | | |
|---|---|---|---|---|
| 10,169,315 | B1* | 1/2019 | Heckel | G06F 21/60 |
| 2006/0184395 | A1* | 8/2006 | Millwee | G06F 21/31 705/3 |
| 2006/0248592 | A1* | 11/2006 | Agrawal | G06F 21/6245 707/999.009 |
| 2016/0026819 | A1* | 1/2016 | Malik | G06F 21/6218 726/1 |
| 2016/0055322 | A1* | 2/2016 | Thomas | H04L 63/08 726/7 |
| 2017/0053130 | A1* | 2/2017 | Hughes | G16H 10/60 |
| 2017/0147757 | A1* | 5/2017 | Keen | H04L 67/12 |
| 2017/0243028 | A1* | 8/2017 | LaFever | G06F 21/6254 |
| 2018/0307859 | A1* | 10/2018 | LaFever | H04L 63/20 |
| 2020/0067895 | A1* | 2/2020 | Adami | H04L 63/0442 |
| 2021/0279363 | A1* | 9/2021 | Jones | G06F 16/9558 |

FOREIGN PATENT DOCUMENTS

| | | |
|---|---|---|
| KR | 10-2018-0045699 A | 5/2018 |
| KR | 10-2019-0130957 A | 11/2019 |

* cited by examiner

*Primary Examiner* — Javier O Guzman
(74) *Attorney, Agent, or Firm* — Revolution IP, PLLC

(57) ABSTRACT

The present invention is to provide a system and a method for integrated usage of personal data capable of increasing the usability of personal data of a personal data user and a data subject by allowing the data subject of the personal data to confirm a corresponding usage request list and approve the usage of the personal data with respect to the data usage request of the personal data user.

2 Claims, 6 Drawing Sheets

[FIG.5]

| Report summary |
|---|
| Identification information |
| Academic career data |
| Income data |
| Asset data |
| Criminal record data |
| Credit data |
| ⁝ |

SYSTEM AND METHOD FOR INTEGRATED USAGE OF PERSONAL DATA USING SCRAPING TECHNOLOGY BASED ON END-USERS CONSULTATION

TECHNICAL FIELD

The present invention relates to a system and a method for integrated usage of personal data and particularly, to a system and a method for integrated usage of personal data configured in an end-users aspect by integrating personal data distributed in government, public institutions, companies, etc.

BACKGROUND ART

Due to the development of a current information technology and an increase in computer penetration rate, many people are communicating through computers, and government, public institutions, companies, etc. of generating, storing, and distributing personal data has communicated by high-performance computers that can handle large amounts of data.

On the other hand, based on the government policy of the E-government-oriented government, individual public institutions and companies strive first for the integration and security issues of personal data, and as a result, some problems such as existing data redundancy and integrity, security, etc. have been improved.

A system for integrated usage of personal data has largely three improvements. First, interests on information assets between end-users in other words, a user of personal data and a subject of personal data are configured and the personal data is transferred to personal data users from personal data holding institutions within the scope of informational providing consultation between the parties.

A second aspect of the system for integrated usage of personal data is to collect and process the personal data by accessing all institutions, government, public institutions, companies, etc. holding the personal data only by an access to one channel of the system for integrated usage of personal data. For example, personal identification information and authentication information are input to a personal data inquiry system provided by a government site to collect the personal data accessible from the corresponding government site and the personal data is accurately processed to be output to a data user.

A third aspect of the system for integrated usage of personal data is to collect and store data through a cloud with security performance capable of handling the personal data as current domestic and international standards and maintain physical, systematic, internal, and social engineering security statuses from various security threats through a procedure of maintaining member information only within the range of one cycle from a membership stage of the personal data user and the data subject to output of personal data.

As conventional systemic constraints and problems, a conventional personal data inquiry system allows only personal data access to the data subject and blocks personal data access to a personal data user of a third party, and even when allowed, since the data subject cannot actively specify the user and the scope of the user, the personal data is limitedly used only in some public institutions.

Further, when the conventional personal data inquiry system accesses personal data, there is a need for identification and information providing approval procedures specified by each personal data holding institution, but the data subject has a lot of difficulties to store and perform information providing manuals of all personal data holding institutions to be accessed and has a difficulty of accessing and using the personal data to be satisfied due to time constraints.

Further, the conventional personal data inquiry system is primarily for holding the personal data and stores the original of personal data in a storage such as a disk and the like, but there is a problem that this may be exposed to the system, network hacking, and the like, and furthermore, may be always exposed to social engineering hacking that is accessible to personal data by a system administrator and the like.

PRIOR ARTS

Patent Document (Patent Document 1) Korean Patent Publication No. 10-2019-0130957 (Publication Date: Nov. 25, 2019)
(Patent Document 2) Korean Patent Publication No. 10-2018-0045699 (Publication Date: May 4, 2018)

DISCLOSURE

Technical Problem

Therefore, the present invention is derived to solve the problems and an object of the present invention is to provide a system and a method for integrated usage of personal data capable of increasing the usability of personal data of a personal data user and a data subject by allowing the data subject of the personal data to confirm a corresponding usage request list and approve the usage of the personal data with respect to the data usage request of the personal data user.

Another object of the present invention is to provide a system and a method for integrated usage of personal data so as to match each personal data usage purpose by arbitrarily regulating a type and a scope of personal data to be used by a user and a data subject.

Yet another object of the present invention is to provide a system and a method for integrated usage of personal data capable of collecting and processing a large amount of personal data at a short time through integrated authentication instead of individual authentication to each personal data holding institution for data access.

Still another object of the present invention is to provide a system and a method for integrated usage of personal data capable of securing personal data management rights of a data subject by accurately processing the personal data in a data report form with an approval range of the usage of personal data, providing the processed personal data to the user, and notifying the fact of collecting and providing personal data to the data subject after providing the personal data.

Still yet another object of the present invention is to provide a system and a method for integrated usage of personal data capable of preventing security accidents in advance so that data subject identification information, authentication information, and data usage list input simultaneously with membership of a personal data user and a data subject and report data output through collection and processing steps are automatically discarded immediately after the usage of the personal data.

The objects of the present invention are not limited to the above-mentioned objects, and other objects and advantages of the present invention, which are not mentioned, will be understood through the following description, and will become apparent from the embodiments of the present invention. In addition, it will be appreciated that the objects and advantages of the present invention will be easily realized by those skilled in the art based on the appended claims and a combination thereof.

Technical Solution

A feature of a system for integrated usage of personal data using scraping technology based on end-users consultation according to the present invention to achieve the object is a system for integrated usage of personal data communicating with a data user terminal, a data subject terminal, and a personal data holding institution system. The system may include a cloud storage unit for storing at least one of data subject identification information, authentication information, and a data usage list, a data user membership management unit which receives a membership from the data user terminal and receives the data subject identification information and the data usage list to be stored in the cloud storage unit, a data subject membership management unit which receives the membership and the data usage approval from the data subject terminal and receives the authentication information to be stored in the cloud storage unit, a memory which is a temporary storage, a data processing unit which stores at least one of the data subject identification information, the authentication information, and the data usage list in the memory from the cloud storage unit after the data usage is approved from the data subject terminal and generates a report for the personal data in which scraping and verification procedures are completed, an output unit which receives a report type output from the data processing unit, provides the report to the data user terminal, and notifies the report provision fact to the data subject terminal, a scraping unit which receives at least one of the data subject identification information, the authentication information, the data usage list from the data processing unit and receives and scraps the personal data by accessing the personal data holding institution, a scraping preprocessing unit which preprocesses a membership procedure of the personal data holding institution system before the scraping, a verification unit which verifies data integrity of the personal data after the scraping is completed, and a deletion unit which deletes at least one of the data subject identification information, the authentication information, and the data usage list in the personal data integrated usage system after providing the report and notifying the report provision fact from the output unit.

Preferably, the data processing unit may receive and combine the personal data of the personal data holding institution of the data subject in the scraping unit and generate a report type output as the integrated personal data.

A feature of a method for integrated usage of personal data using scraping technology based on end-users consultation according to the present invention to achieve the object is a method for integrated usage of personal data communicating with a data user terminal, a data subject terminal, and a personal data holding institution system. The method may include the steps of receiving, by a data user membership management unit, a membership from the data user terminal, and receiving at least one of data subject identification information and a data usage list to be stored in a cloud storage unit, receiving, by a data subject membership management unit, the membership and the data usage approval from the data subject terminal and receiving authentication information to be stored in the cloud storage unit, storing, by a data processing unit, the data subject identification information, the authentication information, and the data usage list in a memory from the cloud storage unit when the data usage approval is completed from the data subject terminal, receiving, by a scraping unit, the data subject identification information, the authentication information, and the data usage list from the data processing unit and receiving personal data of the data subject by accessing the personal data holding institution, comparing and verifying, by a verification unit, the data subject identification information and the data usage list stored in the memory, and the personal data of the data subject received through the scraping unit, generating, by the data processing unit, a report type output as integrated personal data by receiving and then combining the personal data compared and verified by the verification unit, providing, by the output unit, a report to the data user terminal and notifying the report provision fact to the data subject terminal, and deleting, by a deletion unit, the data subject identification information, the authentication information, and the data usage list, and the report data stored after providing the report of the output unit and notifying the report provision fact.

[Advantageous Effects]

The system and the method for integrated usage of personal data using scraping technology based on end-users consultation as described above have the following effects.

First, it is possible to provide the system and the method for integrated usage of personal data capable of increasing the usability of the personal data through a consultation procedure between the parties in a usage part of the personal data between the user and the data subject.

Second, it is possible to provide the system and the method for integrated usage of personal data so as to secure self-information decision authority of a data subject in areas of generating, accessing, collecting, distributing, and the like the personal data by actively regulating the contents of usable personal data by the data subject.

Third, it is possible to provide the system and the method for integrated usage of personal data capable of facilitating accessibility of the data subject to the personal data held by a plurality of personal data holding institutions and providing individual set of data as integrated personal data by integrating various types and a large amount of personal data based on features such as usage purpose, relation, etc.

Fourth, it is possible to provide the system and the method for integrated usage of personal data capable of securing data integrity on personal data of the data subject and management authority of the data subject by notifying the personal data collection and provision fact to the data subject after providing the personal data while verifying objectively the contents of the consulted personal data and an application range thereof in a disinterested third-party system.

Fifth, it is possible to provide the system and the method for integrated usage of personal data capable of being defended from physical and systematic security threats based on a security cloud evaluating the same domestic and foreign standards and performance as a personal data holding institution system in terms of security standards and performance in the step of collecting and storing data subject identification information, authentication information, and data usage list required for data processing.

Sixth, it is possible to provide the system and the method for integrated usage of personal data capable of being defended from internal and social engineering security threats by automatically deleting data subject identification information, authentication information, data usage list, and report data in the system after providing the personal data to the data user and notifying the personal data collection and provision fact to the data subject.

In addition to the above-described effects, specific effects of the present invention will be described together with explanation of specific matters for carrying out the present invention.

DESCRIPTION OF DRAWINGS

FIG. 5 is a diagram illustrating an example of a report type output provided to the data user terminal communicating with the system for integrated usage of personal data using scraping technology based on end-users consultation according to an embodiment of the present invention.

MODES FOR THE INVENTION

Figure 1:
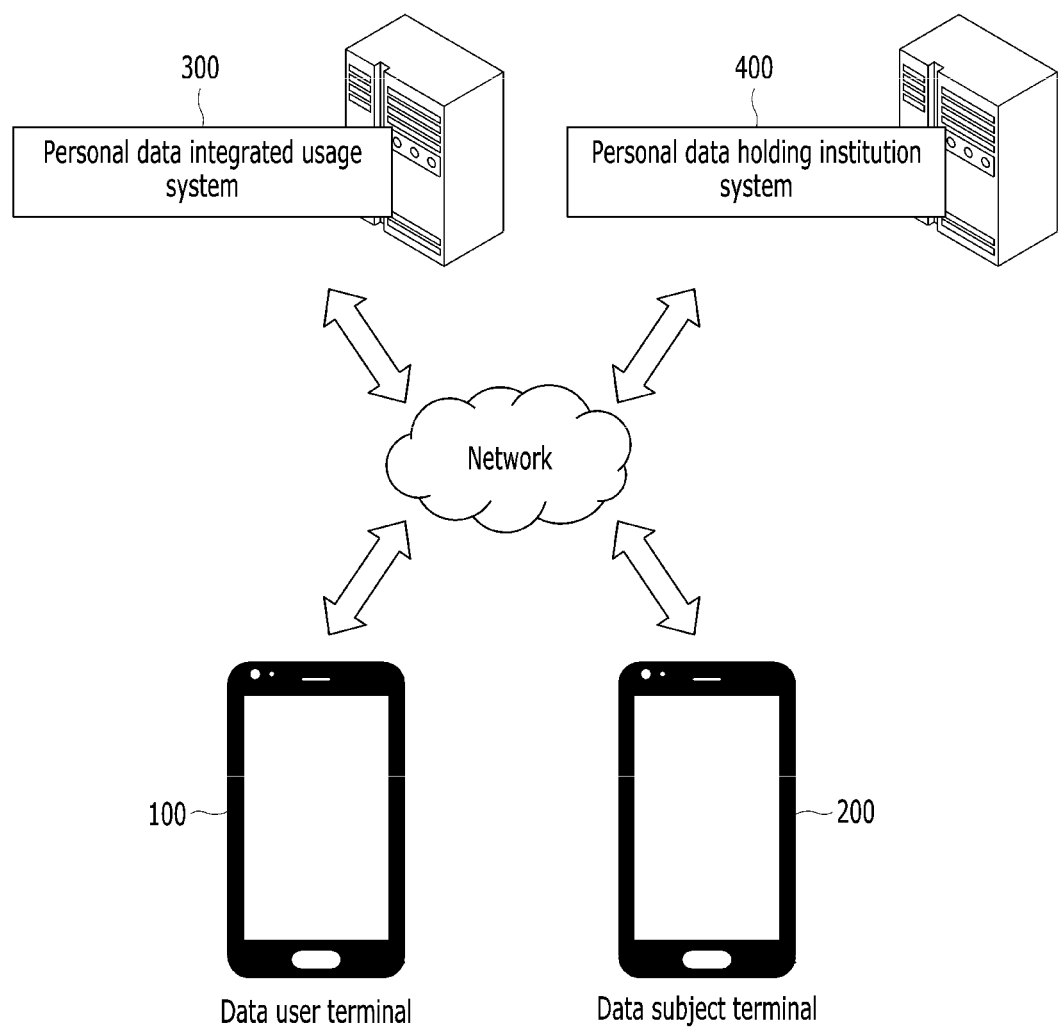
FIG. 1 is a block diagram illustrating an overall configuration of a system for integrated usage of personal data using scraping technology based on end-users consultation according to an embodiment of the present invention.

Other objects, features and advantages of the present invention will be apparent from the detailed description of embodiments with reference to the accompanying drawings.

Hereinafter, embodiments of the present invention will be described in detail so as to be easily implemented by those skilled in the art, with reference to the accompanying drawings. However, the present invention may be implemented in various different forms and is not limited to the embodiments described herein. In order to clearly explain the present invention in the drawings, parts not related to the description have been omitted, and like reference numerals designate like elements throughout the specification.

Throughout the specification, unless explicitly described to the contrary, when a certain part "comprises" a certain component, it will be understood to imply the inclusion of stated components but not the exclusion of any other components. In addition, the terms "-er", "-or", and "module" described herein mean units for processing at least one function and operation and can be implemented by hardware, or software, or a combination of hardware and software.

Terms used herein adopt general terms which are currently widely used as possible by considering functions in the present invention, but the terms may vary depending on intentions of those skilled in the art, precedents, emergence of new technology, etc. Further, in a specific case, there are terms arbitrarily selected by an applicant, and in this case, the meanings of the terms will be disclosed in detail in a corresponding description part of the present invention. Accordingly, the terms used herein should be defined based on not just names of the terms but the meanings of the terms and the contents throughout the present invention.

Preferred embodiments of a system and a method for integrated usage of personal data using scraping technology based on end-users consultation according to the present invention will be described as follows with reference to the accompanying drawings. However, the present invention is not limited to embodiments disclosed below but embodied in many different forms, and the present embodiments are merely to be provided to complete the disclosure of the present invention and fully inform the scope of the invention to those skilled in the art. Therefore, the embodiments described in the present specification and the configurations illustrated in the drawings are merely the most preferred embodiment of the present invention and are not intended to represent all of the technical ideas of the present invention, and thus, it should be understood that various equivalents and modifications capable of replacing the embodiments at the time of this application.

In addition, when a component is described as being "connected", "coupled" or "accessed" to another component, it will be understood that the components may be directly connected or accessed to each other, but other components are "interposed" between the components, or each component may be "connected", "coupled" or "accessed" through other components.

For reference, 'authentication information' disclosed herein is information such as secret key-based authentication technology, public key-based authentication technology, vivo information-based authentication technology, and the like, having domestically and internationally standardized standards. Therefore, the authentication information refers to whole electronic information which is electronically generated by the technical method to allow the identity verification.

FIG. 1 is a block diagram illustrating an overall configuration of a system for integrated usage of personal data using scraping technology based on end-users consultation according to an embodiment of the present invention.

As illustrated in FIG. 1, an overall configuration of a system for integrated usage of personal data of the present invention may include a data user terminal 100, a data subject terminal 200, a personal data integrated usage system 300, and a personal data holding institution system 400.

The data user terminal 100 is a terminal that is held by a user requesting personal data which has been distributed in various personal data holding institutions, specifically, a government, public institutions, and businesses.

The data subject terminal 200 is a terminal which is held by a data subject that confirms and approves a personal data usage list to be requested and registers authentication information when the usage of the personal data distributed in various personal data holding institutions, specifically, a government, public institutions, and businesses has been requested.

To this end, the data user terminal 100 and the data subject terminal 200 may be provided with a program (application) for executing an operation such as input, selection, and approval of the personal data. The program (application) may be provided and installed from the personal data integrated usage system 300 or other smartphone application markets (e.g., Apple App Store, Google Android Market, etc.)

In addition, the data user terminal 100 and the data subject terminal 200 may transmit and receive service information from and to the personal data integrated usage system 300 via a communication network. At this time, the communication network may include wired networks, such as local area networks (LANs), wide area networks (WANs), metropolitan area networks (MANs), and integrated service digital networks (ISDNs), or wireless networks such as wireless LANs, CDMA, Bluetooth, and satellite communication, but the scope of the present invention is not limited thereto.

Further, the data user terminal 100 and the data subject terminal 200 may be provided as one of various components of electronic devices, such as a computer, an ultra mobile PC (UMPC), a workstation, a net-book, personal digital assistants (PDA), a portable computer, a web tablet, a wireless phone, a mobile phone, a smart phone, an e-book, a portable multimedia player (PMP), a portable game machine, a navigation, a black box, or a digital camera. However, the present invention is not limited thereto.

The personal data integrated usage system 300 may manage the personal data subject to confirm the corresponding usage request list and approve the personal data usage in conjunction with the data subject terminal 200 with respect to the data usage request of the personal data user requested from the data user terminal 100.

In addition, the personal data integrated usage system 300 may manage the type and scope of the personal data to be used to be arbitrarily regulated by the user and the data subject and coincide with each personal data usage purpose.

Further, the personal data integrated usage system 300 may manage a large amount of personal data to be collected and processed at a short time through integrated authentication instead of individual authentication in the personal data holding institution system 400 for data access.

Further, the personal data integrated usage system 300 may accurately process the personal data in a data report form within an approval range of the personal data usage to provide the processed personal data to the data user terminal 100 and may notify the personal data collection and provision fact to the data subject terminal 200 after providing the personal data.

The personal data integrated usage system 300 may prevent security accidents in advance so that data subject identification information, authentication information, and data usage list input simultaneously with membership from the data user terminal 100 and the data subject terminal 200 and report data output through collection and processing steps are automatically discarded immediately after the usage of the personal data.

The personal data holding institution system 400 may include various personal data holding institutions, specifically, government, public institutions, companies, and the like.

Meanwhile, the personal data integrated usage system 300 and the personal data holding institution system 400 includes a program module which has the same configuration as a typical web server with hardware, and is implemented in various types of languages such as C, C++, Java, Visual Basic, and Visual C with software to perform various functions.

The personal data integrated usage system 300 and the personal data holding institution system 400 may be implemented by using a web server program that is variously provided according to operating systems such as DOS, Windows, Linux, Unix, and Macintosh on general server hardware, and as typical examples, a website and an internet information server (IIS) used in a Windows environment, and CERN, NCSA, and APACHE used in a UNIX environment may be used.

Figure 2:
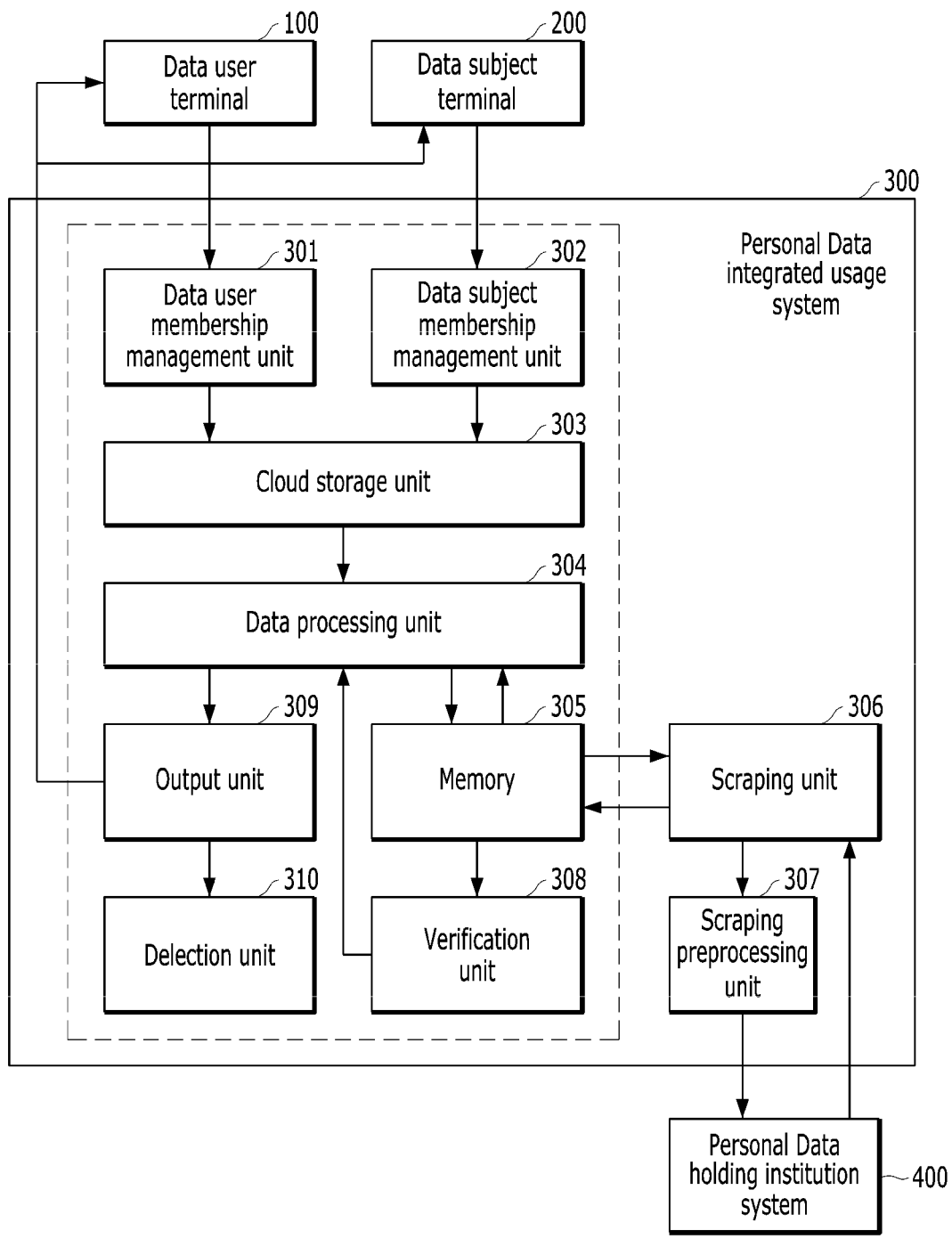
FIG. 2 is a block diagram specifically illustrating a configuration of the system for integrated usage of personal data according to an embodiment of the present invention in FIG. 1.

FIG. 2 is a block diagram specifically illustrating a configuration of the system for integrated usage of personal data according to an embodiment of the present invention in FIG. 1. The system for integrated usage of personal data illustrated in FIG. 2 follows an embodiment, and components thereof are limited to the embodiment illustrated in FIG. 2 and if necessary, some components may be added, modified, or deleted.

As illustrated in FIG. 2, the personal data integrated usage system 300 of the present invention a cloud storage unit 303, a data user membership management unit 301, a data subject membership management unit 302, a data processing unit 304, a memory 305, a scraping unit 306, a scraping preprocessing unit 307, a verification unit 308, an output unit 309, and a deletion unit 310.

The cloud storage unit 303 may store a data usage list and data subject identification information provided by the data user terminal 100, and authentication information provided by the data subject. The cloud storage unit 303 may be present in a safe zone blocked by a firewall.

The data user membership management unit 301 may receive a membership from the data user terminal 100 and may receive the data subject identification information and the data usage list to be stored in the cloud storage unit 303.

The data subject membership management unit 302 may receive the membership and the data usage approval from the data subject terminal 200 and may receive the authentication information to be stored in the cloud storage unit 303.

The memory 305 is a temporary storage and may be configured by magnetic storage media (e.g., read-only memory (ROM), random-access memory (RAM), floppy disk, hard disk, etc.) and optical reading media (e.g., CD-ROM, and digital versatile disc (DVD)).

The data processing unit 304 may store the data subject identification information, the authentication information, and the data usage list in the memory 305 from the cloud storage unit 303 after the data usage is approved from the data subject terminal 200.

The scraping unit 306 receives the data subject identification information, the authentication information, and the data usage list from the data processing unit 304 and receives the personal data of the data subject by accessing the personal data holding institution system 400 to store the data in the memory 305. At this time, the communication between the scraping unit 306 and the personal data holding institution system 400 may be performed through an application programming interface (API). The API means a tool that can receive a user interface provided by the personal data holding institution system 400 through a preset regulation language and then directly develop applications and services.

The scraping unit 306 may immediately delete the authentication information on the memory 305 used after the reception of the personal data is finally completed.

The scraping preprocessing unit 307 may join a membership using membership information of the personal data integrated usage system 300 when the membership is required by a unique accessing method of the personal data holding institution system 400. At this time, when the data subject is already joined in the personal data holding institution system 400, the data subject may access the personal data holding institution system 400 as the membership information and the authentication information.

The verification unit 308 may compare and verify the data subject identification information and the data usage list on the memory 305, and the personal data of the data subject received from the scraping unit 306. As the comparing and verifying result, the information reception may be re-requested to the data processing unit 304 during mismatching.

The data processing unit 304 receives and combines the individual personal data of the data subject collected from the personal data holding institution system 400 in the scraping unit 306 and may generate a report type output as the integrated personal data.

The output unit 309 receives the report type output from the data processing unit 304 and provides the report to the data user terminal 100, and may notify the report provision fact to the data subject terminal 200.

The deletion unit 310 may delete all of the data subject identification information, the authentication information, the data usage list and the report data in the personal data integrated usage system 300 immediately after providing the report and notifying the report provision fact.

Figure 3:
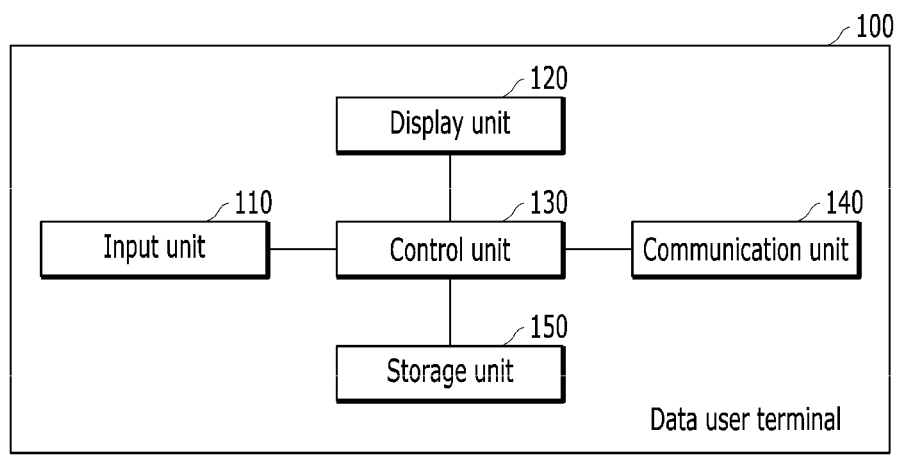
FIG. 3 is a block diagram specifically illustrating a configuration of a data user terminal communicating with the system for integrated usage of personal data in FIG. 1.

FIG. 3 is a block diagram specifically illustrating a configuration of a data user terminal communicating with the system for integrated usage of personal data in FIG. 1.

Referring to FIG. 3, the data user terminal 100 may include a communication unit 140, a storage unit 150, an input unit 110, a control unit 130, and a display unit 120.

The communication unit 140 may transmit and receive service information from and to the personal data integrated usage system 300 via a communication network. At this time, the communication network may include wired networks, such as local area networks (LANs), wide area networks (WANs), metropolitan area networks (MANs), and integrated service digital networks (ISDNs), or wireless networks such as wireless LANs, CDMA, Bluetooth, and satellite communication, but the scope of the present invention is not limited thereto.

The storage unit 150 may store a personal data report provided from the personal data integration usage system 300.

The input unit 110 may include a touch panel or a keypad for receiving the selection of the data user. The data user may input his/her membership information, and input data subject identification information and a data usage list of the personal data to be used.

The control unit 130 accesses the personal data integration usage system 300 via the network through the communication unit 140 and may transmit the data subject identification information and the data usage list of the personal data to be used to the personal data integration usage system 300 according to the selection of the input unit 110.

In addition, the control unit 130 may store the report transmitted from the personal data integrated usage system 300 in the storage unit 150 and read the report from the storage unit 150 and display the read report on the display unit 120.

Figure 4:
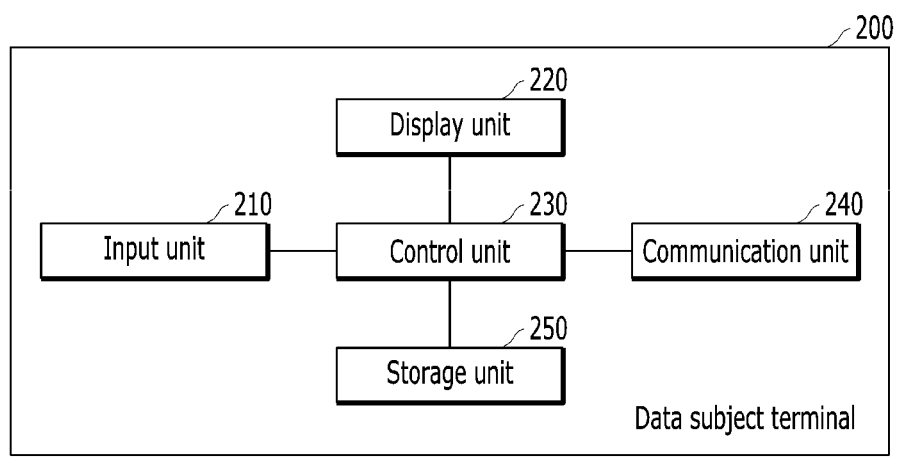
FIG. 4 is a block diagram specifically illustrating a configuration of a data subject terminal communicating with the system for integrated usage of personal data in FIG. 1.

FIG. 4 is a block diagram specifically illustrating a configuration of a data subject terminal communicating with the system for integrated usage of personal data in FIG. 1.

Referring to FIG. 4, the data subject terminal 200 may include a communication unit 240, a storage unit 250, an input unit 210, a control unit 230, and a display unit 220.

The communication unit 240 may transmit and receive service information from and to the personal data integrated usage system 300 via a communication network. At this time, the communication network may include wired networks, such as local area networks (LANs), wide area networks (WANs), metropolitan area networks (MANs), and integrated service digital networks (ISDNs), or wireless networks such as wireless LANs, CDMA, Bluetooth, and satellite communication, but the scope of the present invention is not limited thereto.

The storage unit 250 may store a personal data report notification fact document provided from the personal data integration usage system 300.

The input unit 210 may include a touch panel or a keypad for receiving the selection of the data subject terminal 200. The data subject terminal 200 may input its membership information, confirm the personal data usage list requested by the personal data integrated usage system 300, and input the approval thereto. When the approval is input, the data subject terminal 200 may input separately its authentication information.

The control unit 230 accesses the personal data integration usage system 300 via the network through the communication unit 240 and may transmit whether to approve the personal data usage list and the authentication information requested from the personal data integration usage system 300 according to the selection of the input unit 210.

In addition, the control unit 230 may store a report provision notice transmitted from the personal data integrated usage system 300 in the storage unit 250 and read the report provision notice from the storage unit 250 and display the read report provision notice on the display unit 220.

FIG. 5 is a diagram illustrating an example of a report type output provided to the data user terminal communicating with the system for integrated usage of personal data using scraping technology based on end-users consultation according to an embodiment of the present invention.

The report type output illustrated in FIG. 5 is only one embodiment, but is not limited thereto. Therefore, the data user terminal 100 may strategically and selectively access the personal data of various data subjects depending on the relationship between the data subjects, and the configuration thereof may vary as needed.

An operation of the system for integrated usage of personal data using scraping technology based on end-users consultation according to the present invention configured as such will be described in detail with reference to the accompanying drawings. Like reference numerals in FIGS. 1 to 4 denote like members performing the same function.

Figure 6A:
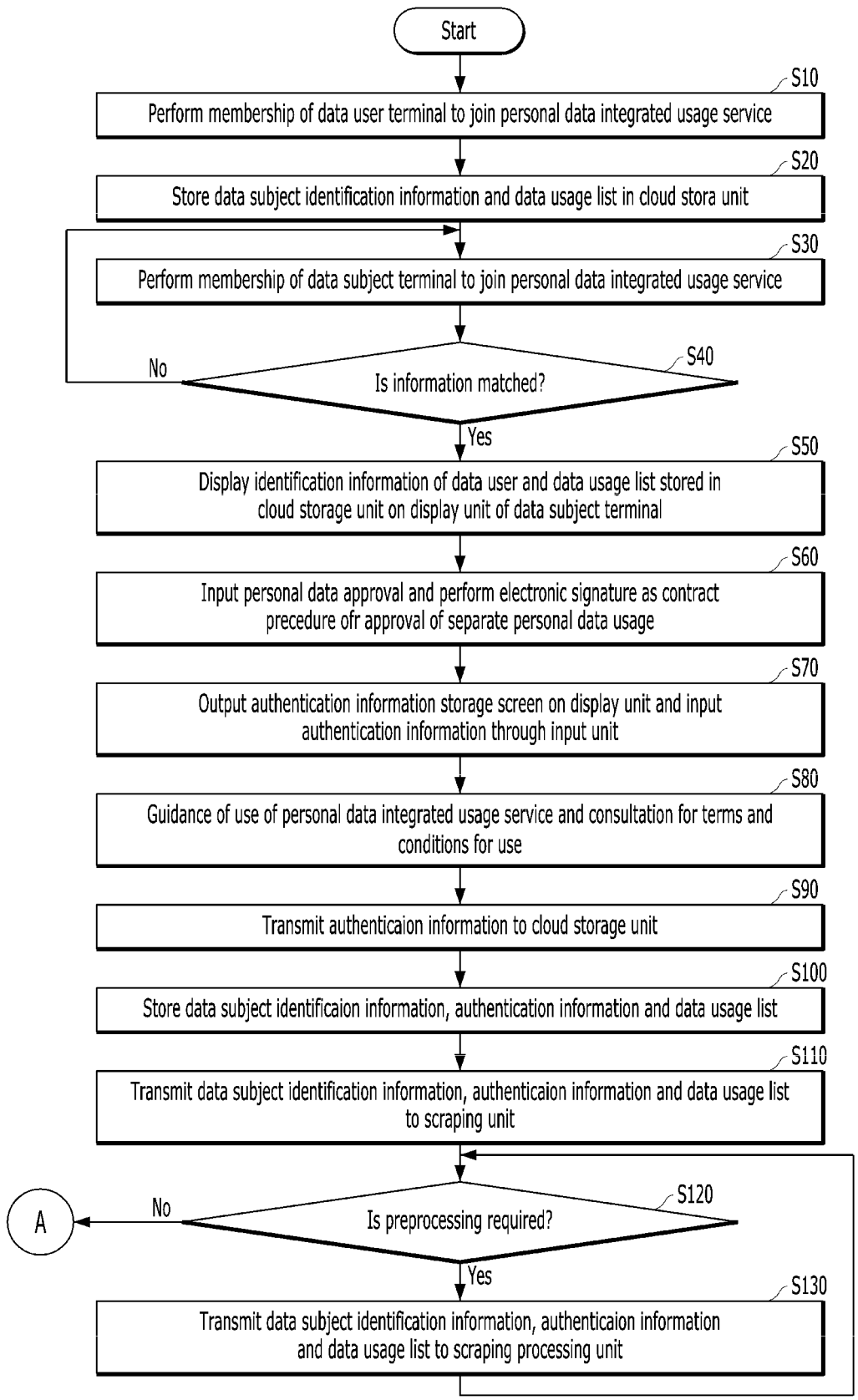
FIGS. 6A and 6B are flowcharts for describing a method for integrated usage of personal data using scraping technology based on end-users consultation according to an embodiment of the present invention.
Figure 6B:
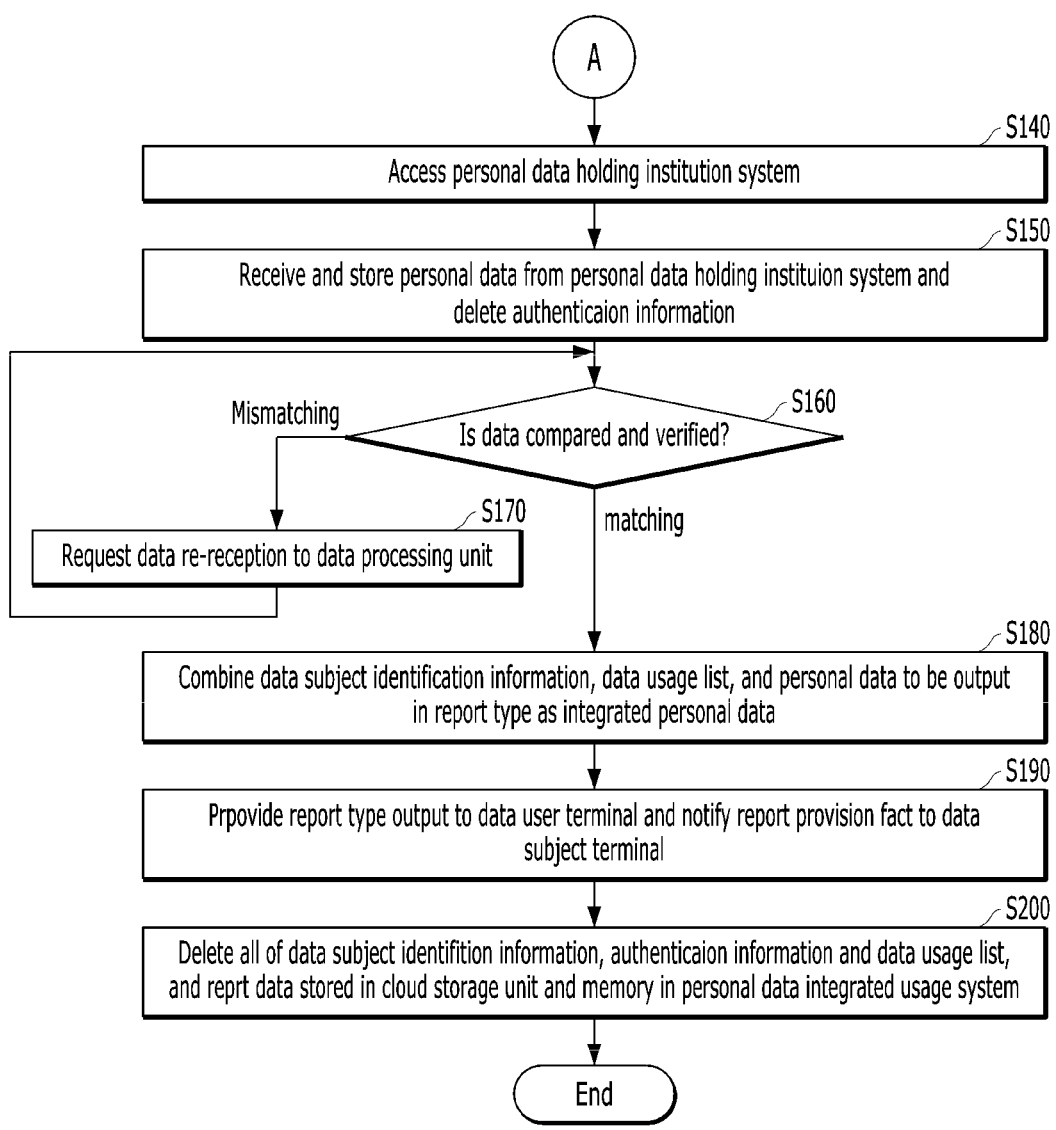

FIGS. 6A and 6B are flowcharts for describing a method for integrated usage of personal data using scraping technology based on end-users consultation according to an embodiment of the present invention.

Referring to FIGS. 6A and 6B, first, the data user terminal 100 performs a membership through the membership management unit 301, and joins a personal data integrated usage service (S10).

Specifically, an ID, a password, identification information of the data user, personal data reception information, and the like to be used in the personal data integrated usage system 300, and identification information and a data usage list of a personal data subject to be used are received from the input unit 110. Next, a guidance for the use of personal data integrated usage service and a consent to the terms and conditions for use are performed.

Subsequently, the data subject identification information and the data usage list are stored in the cloud storage unit 303 by using the data user membership management unit 301 in connection with the identification information of the data user terminal 100 (S20).

Next, the data subject terminal 200 performs a membership using the membership management unit 302 and joins the personal data integrated usage service 300 (S30).

Specifically, the ID, the password, the identification information of the data user, the personal data reception information, and the like to be used in the integrated usage system are received.

Then, the identification information of the data subject is compared with the informational subject identification information requested by the data user in the cloud storage unit 303 by using the data subject membership management unit 302 (S40).

In addition, as the comparing result, when matching (S40), the identification information of the data user and the data usage list stored in the cloud storage unit 303 are transmitted to the control unit 230 of the data subject terminal 200 and the control unit 230 displays the contents on the display unit 220 (S50).

Subsequently, when the output contents of the display unit 220 is recognized from the data subject terminal 200 and the data subject approves the personal data usage, the input unit 210 receives the personal data usage approval and performs an electronic signature as a contract procedure for approval of separate personal data usage (S60).

After the electronic signature, an authentication information storage screen is outputted on the display unit 220 by using the control unit 230 and the authentication information of the data subject is received through the input unit 210 (S70).

Next, a guidance for the use of personal data integrated usage service and a consent to the terms and conditions for use are performed (S80).

Next, the data subject terminal 200 transmits the authentication information associated with the compared and matched data subject identification information to the cloud storage unit 303 (S90).

In addition, the data subject identification information, the authentication information, and the data usage list in the cloud storage unit 303 are stored in the memory 305 by using the data processing unit 304 (S100). In addition, the data subject identification information, authentication information, and the data usage list on the memory are received through the scraping unit 306 (S110).

Meanwhile, when the preprocessing such as membership and the like is required (S120), the data subject identification information, authentication information, and the data usage list are transmitted to the scraping preprocessing unit 307 by using the scraping unit 306 (S130).

In addition, when the preprocessing is not required or completed (S120), the personal data holding institution system 400 is accessed (S140).

Subsequently, the personal data is received from the personal data holding institution system 400 by using the scraping unit 306 and stored in the memory 305. In addition, after the personal data reception is completed, the authentication information on the memory 305 used is deleted immediately (S150).

Next, the scraped personal data is compared and verified with the data subject identification information and the data usage list on the memory 305 after scarping by using the verification unit 308 (S160).

If the verification result (S160) is mismatched, the information re-reception is requested to the data processing unit 304 (S170).

When the verification result (S160) is matched, the data subject identification information and the data usage list on the memory 305 and the scraped personal data are combined by using the data processing unit 304 to generate a report type output as the integrated personal data and transmit the generated report type output to the output unit (S180).

Next, the report type output is received from the data processing unit 304 by using the output unit 309 to be provided to the data user terminal 100, and the report provision fact is notified to the data subject terminal 200 (S190).

Accordingly, the control unit 130 of the data user terminal 100 may store the report transmitted from the personal data integrated usage system 300 in the storage unit 150 and read the report from the storage unit 150 and display the read report on the display unit 120.

Meanwhile, the control unit 230 of the data subject terminal 200 may store a report provision notice transmitted from the personal data integrated usage system 300 in the storage unit 250 and read the report provision notice from the storage unit 250 and display the read report provision notice on the display unit 220.

In addition, when the corresponding event is transmitted to the deletion unit 310 after providing the report and notifying the report provision fact from the output unit 309, all of the data subject identification information, the authentication information, the data usage list, and the report data stored in the cloud storage unit 303 and the memory 305 in the personal data integrated usage system are immediately deleted by using the deletion unit 310 (S200).

By using the personal data integrated usage system according to the embodiments described above, there is an advantage capable of promoting the informational benefit of the data user and harmony of interests as technology of information self-determination authority of the data subject. In addition, it is possible to rapidly collect and combine the personal data using computational equipment, and to further increase the effect when accessing a plurality of personal data holding institutions.

In addition, by using the personal data integrated usage system according to the embodiments described above, essential information required for the usage of personal data has volatile properties that disappears once to reduce a security risk of the personal data holding.

Meanwhile, the devices according to the described embodiments may include a processor, a memory storing and executing program data, a permanent storage such as a disk drive, a communication port communicating with an external device, a user interface device such as a touch panel, a key, and a button, and the like. Methods implemented by a software module or an algorithm may be stored on a computer readable recording medium as computer-readable codes or program instructions that can be executed on the processor. Here, the computer readable recording medium includes magnetic storage media (e.g., read-only memory (ROM), random-access memory (RAM), floppy disk, hard disk, etc.), optical reading media (e.g., CD-ROM, and digital versatile disc (DVD)), and the like. The computer readable recording media may be stored and executed with codes which may be distributed in computer systems connected via a network and read by a computer in a distribution method. The media are readable by a computer, stored in memory, and may be executed in the processor.

All documents including publications, patent applications, patents, etc. cited in the disclosed embodiments are illustrated by combining each cited reference individually and specifically, or combined with embodiments disclosed in the same manner as those combined and indicated in the published embodiment as a whole.

In order to understand the disclosed embodiments, reference numerals are given in the preferred embodiments shown in the drawings, specific terms have been used to describe the disclosed embodiments, but the disclosed embodiments are not limited by the specific terms, and the disclosed embodiments may include all components commonly conceived by those skilled in the art.

The disclosed embodiments may be represented by functional block configurations and various processing steps. These functional blocks may be implemented as various numbers of hardware or/and software configurations for executing specific functions. For example, the disclosed embodiments may adopt IC configurations such as a memory, a processing, a logic, a look-up table, and the like, which may execute various functions by control of one or more microprocessors or other control devices. The components of the disclosed embodiments include various algorithms implemented in combination of a data structure, processes, routines, or other programming configurations like being executed by software programming or software elements to be implemented by a programming or scripting language such as C, C++, Java, assembler, and the like. Functional aspects may be implemented as an algorithm executed in one or more processors. In addition, the disclosed embodiments may adopt the related art for electronic environment configuration, signal processing, and/or data processing. The terms "mechanism", "element", "means", and "configuration" can be widely used and are not limited to mechanical and physical configurations. The terms may include the meaning of a series of processes (routines) of software in conjunction with a processor or the like.

The specific implementations described in the disclosed embodiments are examples, and do not limit the scope of the disclosed embodiments in any way. For brevity of the specification, descriptions of conventional electronic configurations, control systems, software, and other functional aspects of the systems may be omitted. In addition, the connection or connection members of the lines between the components illustrated in the drawings exemplarily represent functional connections and/or physical connections, and in an actual device, may be illustrated as various functional connections, physical connections, or circuit connections that can be replaced or added. In addition, unless there is a specific reference such as "essential", "important", etc., it may not be an essential component for application of the disclosed embodiment. It will be understood to those skilled in the art that various embodiments may be made without departing from the technical spirit of the present invention. Therefore, the true technical scope of the present invention should be defined by the technical spirit of the appended claims.

EXPLANATION OF REFERENCE NUMERALS AND SYMBOLS

100: Data user terminal
200: Data subject terminal
300: Personal data integrated usage system
301: Data user membership management unit
302: Data subject membership management unit
303: Cloud storage unit
304: Data processing unit
305: Memory
306: Scraping unit
307: Scraping preprocessing unit
308: Verification unit
309: Output unit
310: Deletion unit
400: Personal data holding institution system

The invention claimed is:

1. A system for integrated usage of personal data communicating with a data user terminal, a data subject terminal, and a personal data holding institution system, the system comprising:
   a cloud storage unit for storing at least one of data subject identification information for identifying a data subject, authentication information and a data usage list defining a personal data list distributed in a personal data holding institution;
   a data user membership management unit which receives a data user membership including an identification information of a personal data user from the data user terminal and receives the data subject identification information and the data usage list to be stored in the cloud storage unit;
   a data subject membership management unit which receives a data subject membership including an identification information of the data subject and the data usage approval from the data subject terminal and receives the authentication information to be stored in the cloud storage unit;
   a memory which is a temporary storage;
   a data processing unit which stores at least one of the data subject identification information, the authentication information, and the data usage list in the memory from the cloud storage unit after the data usage is approved from the data subject terminal and generates a report for the personal data in which scraping and verification procedures are completed;
   an output unit which receives a report type output from the data processing unit, provides the report to the data user terminal, and notifies the report provision fact to the data subject terminal;
   a scraping unit which receives at least one of the data subject identification information, the authentication information, and the data usage list from the data processing unit and receives and scraps the personal data by accessing the personal data holding institution;
   a scraping preprocessing unit which preprocesses a membership procedure of the personal data holding institution system before the scraping;
   a verification unit which verifies data integrity of the personal data after the scraping is completed; and
   a deletion unit which deletes at least one of the data subject identification information, the authentication information, and the data usage list in the personal data integrated usage system after providing the report and notifying the report provision fact from the output unit,
   wherein, after receiving the data subject membership, the data subject membership management unit is
   configured to compare the identification information of data subject with the data subject identification information stored in the cloud storage unit, if matched, then
   configured to transmit the data subject identification information and the data usage list stored in the cloud storage unit to the data subject terminal for the data usage approval,
   wherein, after the data usage approval, the scraping unit receives and combines the data subject's personal data from the personal data holding institution and the data processing unit generates a report type output as an integrated personal data.

2. A method for integrated usage of personal data communicating with a data user terminal, a data subject terminal, and a personal data holding institution system, the method comprising the steps of:

receiving, by a data user membership management unit, a data user membership including an identification information of a personal data user from the data user terminal, and receiving at least one of data subject identification information for identifying a data subject and a data usage list defining a personal data list distributed in a personal data holding institution to be stored in a cloud storage unit;

receiving, by a data subject membership management unit, a data subject membership including an identification information of the data subject and the data usage approval from the data subject terminal and receiving authentication information to be stored in the cloud storage unit;

storing, by a data processing unit, the data subject identification information, the authentication information, and the data usage list in a memory from the cloud storage unit when the data usage approval is completed from the data subject terminal;

receiving, by a scraping unit, the data subject identification information, the authentication information, and the data usage list from the data processing unit and receiving personal data of the data subject by accessing the personal data holding institution;

comparing and verifying, by a verification unit, the data subject identification information and the data usage list stored in the memory, and the personal data of the data subject received through the scraping unit;

generating, by the data processing unit, a report type output as integrated personal data by receiving and then combining the personal data compared and verified by the verification unit;

providing, by the output unit, a report to the data user terminal and notifying the report provision fact to the data subject terminal; and deleting, by a deletion unit, the data subject identification information, the authentication information, the data usage list, and the report data stored after providing the report of the output unit and notifying the report provision fact, wherein, after receiving the data subject membership, the data subject membership management unit is configured to compare the identification information of data subject with the data subject identification information stored in the cloud storage unit, if matched, then configured to transmit the data subject identification information and the data usage list stored in the cloud storage unit to the data subject terminal for the data usage approval, wherein, after the data usage approval, the scraping unit receives and combines the data subject's personal data from the personal data holding institution and the data processing unit generates a report type output as an integrated personal data.

* * * * *